Nov. 13, 1962  S. A. SZACHNITOWSKI  3,063,258
METHOD OF FLASH COOLING VEHICLE CARGO SPACES
Filed Nov. 29, 1960
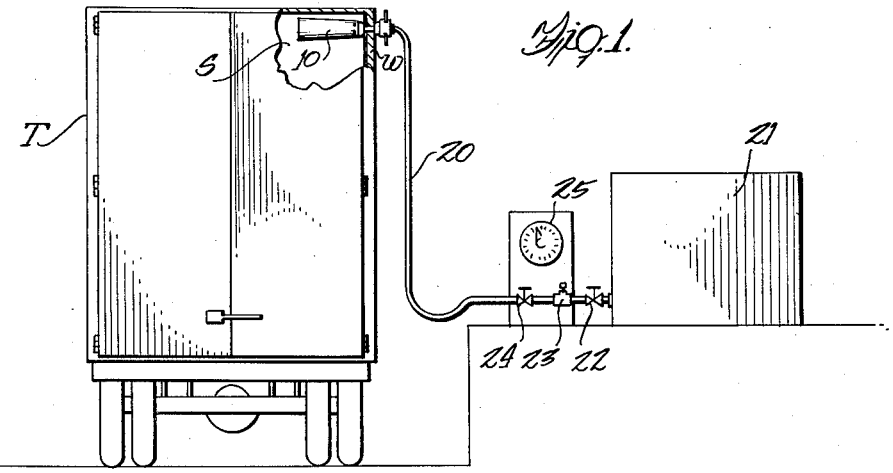
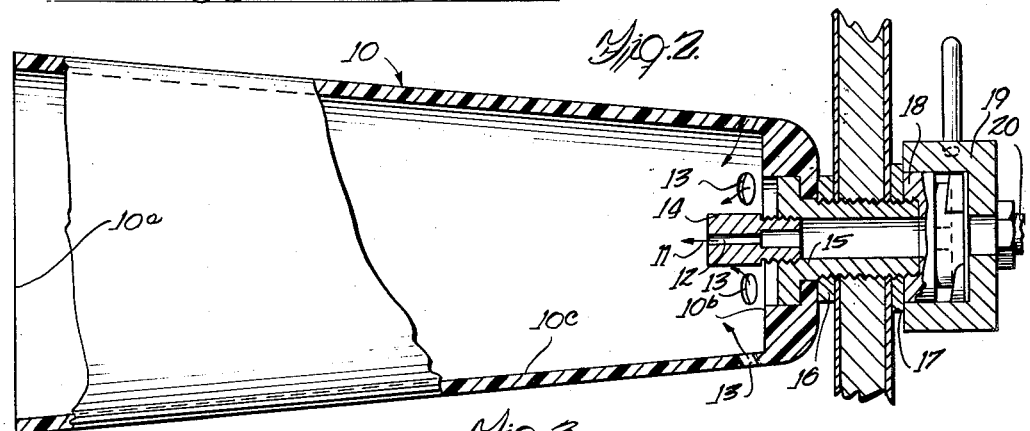
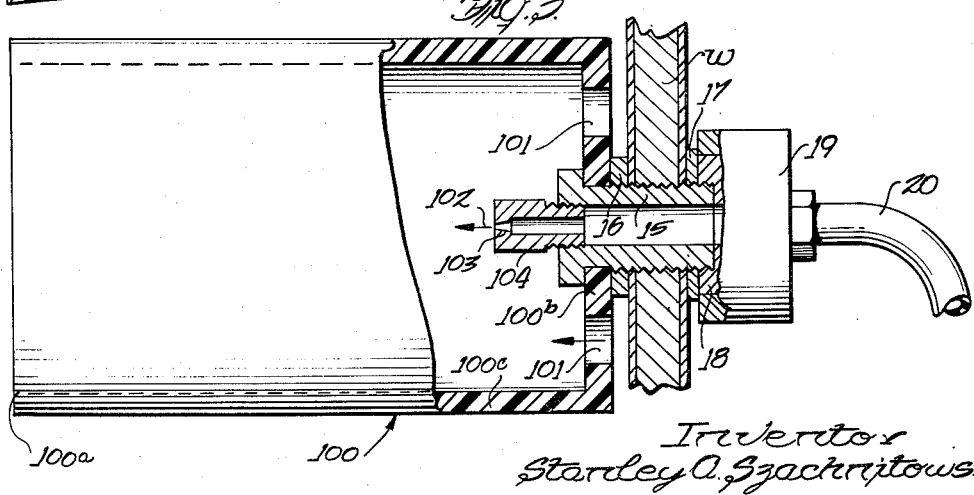
Inventor
Stanley A. Szachnitowski
Dawson, Tilton, Fallon & Lungmus
Attorneys

United States Patent Office 3,063,258
Patented Nov. 13, 1962

3,063,258
METHOD OF FLASH COOLING VEHICLE CARGO SPACES
Stanley A. Szachnitowski, Chicago, Ill., assignor to General Dynamics Corporation, Chicago, Ill., a corporation of Delaware
Filed Nov. 29, 1960, Ser. No. 72,362
3 Claims. (Cl. 62—309)

This invention relates to a method of flash cooling vehicle cargo spaces, and more particularly to a method wherein liquid carbon dioxide is injected into the cargo space.

The method of this invention can be advantageously applied to the flash cooling of the cargo spaces provided by truck trailers and railroad cars.

When liquid carbon dioxide is injected into a cargo space for the direct cooling of the cargo space and its contents, it is frequently difficult to achieve a sufficiently uniform cooling effect. It is of course not desirable to overcool or to employ an excessively long injection time. The carbon dioxide snow and gas which forms upon the release of the liquid carbon dioxide will tend to concentrate in certain areas of the cargo space, especially when the carbon dioxide is being introduced from one location. Even after the injection has continued long enough to cool most of the cargo space to the desired temperature, there will be "hot spots" which may be above the maximum permissible temperature for the particular cargo. Even when the injection nozzle is employed in conjunction with a horn or some auxiliary device for spreading and distributing the carbon dioxide snow and gas, the temperatures at different positions within the cargo space may vary from 10 to 20° or more.

It is therefore a general object of this invention to provide an improved method for the flash cooling of vehicle cargo spaces which substantially overcomes the problems described above. A further more specific object is to provide a method wherein more uniform cooling of the cargo space is achieved without increasing the consumption of carbon dioxide, prolonging the time required for cooling, or requiring any unusual or expensive equipment. Further objects and advantages will be indicated in the following detailed specification.

The method of this invention is illustrated as to certain embodiments thereof in the accompanying drawings, wherein—

FIGURE 1 is a somewhat diagrammatic view indicating how the method might be used in conjunction with the cooling of a truck trailer;

FIGURE 2 is an enlarged view, partly in section, of the carbon dioxide injection unit of FIGURE 1 which has been adapted for practicing the method of this invention; and FIGURE 3 is a view similar to FIG. 2 showing a modified form of the injection unit which may be used for practicing the method of this invention in another of its embodiments.

The method of this invention employs an elongated tubular horn, such as the horn 10 of FIGS. 1 and 2 or the horn 100 of FIG. 3. As indicated in FIG. 1, the horn 10, which may be formed of plastic or other suitable material, is positioned within the vehicle cargo space to be cooled. In the illustration given, there is shown a truck trailer T providing a space S.

Preferably the carbon dioxide spray horn is permanently mounted within the cargo space, although the method of this invention is also applicable to manual units where an operator enters the cargo space for the application of the carbon dioxide. As shown in FIG. 1, the horn 10 is supported near the top of a side wall of the trailer, and is preferably located toward the central portion of the side wall. Alternatively, the horn may be mounted in the front wall, in the top wall, or other suitable location.

As shown more clearly in FIG. 2, the horn 10 has an open front end 10a and a closed rear end 10b. The side walls of the horn 10c are of conical configuration so that the horn enlarges in cross-sectional area from the rear to the front thereof.

In accordance with the present invention a jet of liquid carbon dioxide is released at a point within the rearward portion of the horn. For example, in the embodiment of FIG. 2, the jet of liquid carbon dioxide is released at a point 11 through an orifice 12. As indicated by the arrow in FIG. 2, the jet of carbon dioxide issuing from orifice 12 is oriented toward the open end 10a of the horn. As is well-known in the art, when the liquid carbon dioxide is released within the horn space, it forms carbon dioxide snow and gas, thereby creating a low temperature stream which travels through the horn and is discharged from its open end into the cargo space.

The advantageous results of the present invention are achieved by introducing air from the cargo space into the horn at a position rearwardly from the point at which the jet of liquid carbon dioxide is released. This may be done in various ways. For example, as shown in FIG. 2, the streams of air may be introduced at a plurality of circumferentially-spaced points through inlet ports 13. It will be noted that the inlet ports 13 are located in the side wall 10c of the horn well behind the point 11 at which the carbon dioxide is released.

With the arrangement just described, the cargo space air is sucked into the horn and intimately mixed therein with the stream of carbon dioxide snow and gas. The resulting mixture of snow, gas, and air is discharged from the front end of the horn into the cargo space.

FIGURE 3 shows a modified horn 100, which has an open front end 100a, a closed rear end 100b, and a cylindrical side wall 100c. With a horn of this confiuration, a plurality of inlet openings 101 may be provided in end wall 100b. Thus, as in the embodiment of FIG. 2, the air from the cargo space is introduced into the horn behind the point 102 at which the jet of liquid carbon dioxide is released through orifice 103.

One of the further differences between the embodiment of FIG. 2 and the embodiment of FIG. 3 is that the air inlet ports 13 of the embodiment of FIG. 2 are oriented so that the separate streams of incoming air tend to converge in the vicinity of point 11 where the jet of liquid carbon dioxide is released. The desired orientation is indicated by the arrows in FIG. 2. This arrangement promotes intimate mixing and contacting of the cargo space air with the carbon dioxide snow and gas. On the other hand, the embodiment of FIG. 3 is of advantage where it is desired to maximize the volume of cargo space air being circulated.

In practicing the invention, it will be desirable to provide a suitable injection nozzle and horn mounting, and suitable carbon dioxide supply means. In the illustration given, the discharge orifices 12 and 103 are respectively provided by injection nozzles 14 and 104. The remaining portions of the apparatus are substantially identical, and will therefore be given the same numbers in both embodiments.

The injection nozzles are threadedly mounted within an adapter bushing 15 which extends through truck wall W. Locknuts 16 and 17 are threadedly received on the outside of bushing 15, one of the nuts being on each side of wall W so that bushing 15 and its assembly with the horns are rigidly supported on the wall W. The outer end of bushing 15 is provided with a male adapter 18 for receiving a female detachable coupling 19 which is mounted on the end of a supply hose 20.

As shown in FIG. 1, supply hose 20 extends to a carbon dioxide supply tank 21, which will usually be a refrigerated tank adapted for holding liquid carbon dioxide under pressure and at a low temperature. In flowing from tank 21 the liquid carbon dioxide may pass through a manual valve 22, a safety valve 23, and a solenoid control valve 24. A timer 25 may be used in conjunction with control valve 24 so that the valve may be set to remain open for a designated number of minutes.

By way of a more specific example, liquid carbon dioxide at 290 p.s.i.g. and 0° F. may be injected into the vehicle to be refrigerated, such as the truck trailer of FIG. 1. The orifice 12 may have a diameter of 0.187 inch, and may be positioned within horn 10, as previously described. As the liquid carbon dioxide passes through the orifice, a Joule-Thompson type expansion occurs resulting in the formation of gaseous and solid carbon dioxide at −110° F. The timer 25 is set for a five minute cycle, and the liquid carbon dioxide is continuously injected for the full cycle.

In the method of this invention, as previously described, large volumes of air can be drawn into the horn body through the ports behind the injection orifice. The kinetic energy of the high pressure liquid carbon dioxide will cause the air to be drawn from the space being refrigerated into the horn. This movement of air results in several distinct advantages. First of all, by drawing warm air into the horn, an intimate mixing action takes place whereby the warm air is rapidly chilled and forced back into the space being refrigerated. Secondly, the suction of warm air into the horn provides needed circulation within the space being refrigerated. This added circulation prevents or reduces the development of "hot spots." Also, the intimate mixing action of the warm air and cold solid and gaseous carbon dioxide within the horn results tin more rapid sublimation of the solid carbon dioxide and, therefore, less solid carbon dioxide build-up within the space being refrigerated.

While in the foregoing specification this invention has been described in relation to certain specific embodiments thereof and many details have been set forth for purpose of illustration, it will be apparent to those skilled in the art that the invention is susceptible to other embodiments and that many of the details described herein may be varied considerably without departing from the basic principles of the invention.

I claim:
1. In combination,
 (A) a vehicle having a cargo space defined by closure walls,
 (B) an elongated tubular horn mounted on one of said walls, said horn having an open front end and a closed rear end, said horn having its rear end positioned adjacent said one wall in fixed relation therewith, with said front end directed away from said wall,
 (C) a nozzle mounted in said horn and directed toward said open front end,
 (D) conduit means coupled to said nozzle for delivering liquid carbon dioxide to said nozzle, and
 (E) air port openings in said horn spaced rearwardly of said nozzle, whereby a carbon dioxide jet released from said nozzle is operative to induce flow of a plurality of air streams through said nozzle to substantially uniformly cool said space.

2. The structure of claim 1 in which said space is defined by vertically-extending side walls and generally horizontal top and bottom walls, said one wall being a side wall, with said nozzle being positioned adjacent said top wall.

3. The structure of claim 1 in which said openings are circumferentially spaced relative to said nozzle, said openings being positioned to converge at said nozzle the air streams developed in said openings by said carbon dioxide jet.

References Cited in the file of this patent
UNITED STATES PATENTS

| | | |
|---|---|---|
| 2,337,600 | Harris | Dec. 28, 1943 |
| 2,929,436 | Hampshire | Mar. 22, 1960 |
| 2,941,729 | Goodrie | June 21, 1960 |

FOREIGN PATENTS

| | | |
|---|---|---|
| 842,145 | France | Feb. 27, 1939 |